United States Patent
Wuersch et al.

(10) Patent No.: US 7,171,756 B2
(45) Date of Patent: Feb. 6, 2007

(54) CONSTRUCTION LASER WITH TILTABLE DEFLECTING MEANS

(75) Inventors: Christoph Wuersch, Werdenberg (CH); Reinhard Waibel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/260,045

(22) Filed: Oct. 26, 2005

(65) Prior Publication Data

US 2006/0090357 A1 May 4, 2006

(30) Foreign Application Priority Data

Nov. 4, 2004 (DE) .................. 10 2004 053 249

(51) Int. Cl.
*G01C 15/02* (2006.01)
(52) U.S. Cl. .................. 33/290; 33/DIG. 21
(58) Field of Classification Search ........... 33/290, 33/291, DIG. 21
See application file for complete search history.

(56) References Cited

U.S. PATENT DOCUMENTS

| 5,400,514 | A | * | 3/1995 | Imbrie et al. ............. 33/291 |
| 5,742,387 | A | * | 4/1998 | Ammann .................. 33/290 |
| 5,839,199 | A | * | 11/1998 | Ogawa ................ 33/DIG. 21 |
| 6,314,651 | B1 | * | 11/2001 | Ohtomo et al. ......... 33/DIG. 21 |
| 6,688,009 | B2 | * | 2/2004 | Haijima et al. ............. 33/290 |
| 6,688,011 | B2 | * | 2/2004 | Gamal et al. ............. 33/291 |
| 6,848,188 | B2 | * | 2/2005 | Tacklind et al. ........... 33/290 |
| 7,059,058 | B2 | * | 6/2006 | Kousek et al. ......... 33/DIG. 21 |
| 2001/0025425 | A1 | * | 10/2001 | Haijima et al. ............. 33/290 |
| 2002/0138997 | A1 | * | 10/2002 | Ohtomo et al. ............. 33/290 |
| 2003/0101605 | A1 | | 6/2003 | Tacklind et al. |
| 2003/0145474 | A1 | * | 8/2003 | Tacklind et al. ............. 33/290 |
| 2004/0107589 | A1 | * | 6/2004 | Ohtomo et al. ............. 33/290 |
| 2005/0166409 | A1 | * | 8/2005 | Chou et al. ................ 33/290 |

FOREIGN PATENT DOCUMENTS

EP          0854351         7/1998

* cited by examiner

*Primary Examiner*—G. Bradley Bennett
(74) *Attorney, Agent, or Firm*—Abelman, Frayne Schwab

(57) ABSTRACT

A construction laser having a housing and a tilt part positioned within the housing. The tilt part includes a laser unit for generating a laser beam and a deflector for deflecting the laser beam. The tilt part is adjustable relative to the housing by an actuation element. The actuation element includes at least one piezo actuator that is controlled by control electronics.

26 Claims, 2 Drawing Sheets

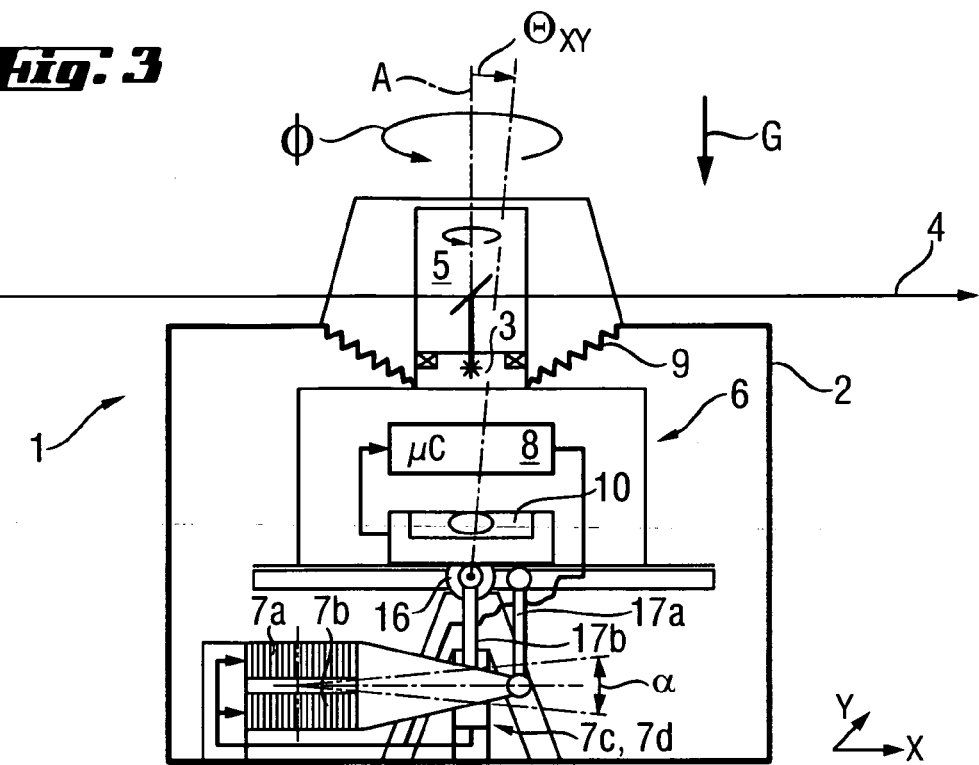
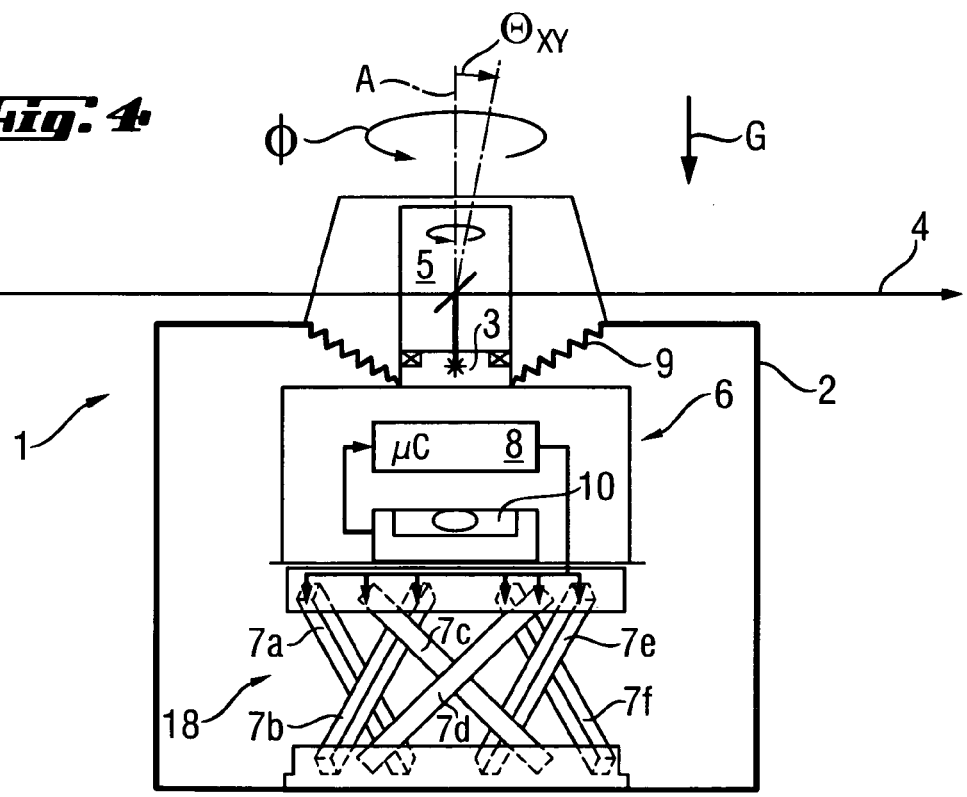

CONSTRUCTION LASER WITH TILTABLE DEFLECTING MEANS

BACKGROUND OF INVENTION

1. Field of Invention

The present invention relates to a construction laser, and more specifically, a rotating construction laser having a rotating deflector mounted in a housing, where the rotating deflector is tiltable about two axes relative to the housing.

2. Description of Prior Art

Rotating construction lasers with a laser beam that rotates at least by segments are used, above all, in the construction industry to determine horizontal or vertical planes on walls, ceilings and floors or planes at defined inclinations on walls, ceilings and floors.

Conventional rotating lasers comprise a platform which is tiltable in two axes and on which the position sensing arrangement and rotating head are located. The rotating head is precisely adjusted relative to this sensing arrangement to several angular seconds. By means of actuating drives such as stepper motors that are fixed to the outer housing, this platform can be tilted relative to the housing in two directions by several angular degrees. Bubble levels are used as position sensors, and are read out optically by means of charge-coupled device (CCD) arrays or with photodiodes. A controlling device reads out these sensors for the x-direction and y-direction and moves the stepper motors in the appropriate direction until the air bubble of the bubble level is in the calibrated center position.

The stepper motors are usually geared down by pretensioned worm gear units to achieve the necessary angular accuracy. In this construction, the structural size, the weight of the stepper motors and the costs of the construction are disadvantageous. Further, the worm gear units can jam at the two end stops. The fact that the drive must be geared down very sharply can lead to mechanical self-locking at the mechanical end stops. When the stepper motor moves to this end stop, the worm is locked. The motor torque is then insufficient for freeing the gear unit from this self-locking.

According to DE 4406914, a self-leveling rotating construction laser has a laser unit that is arranged in a mounting frame, and whose laser beam can be deflected by approximately 90° by deflecting means, which are supported in a rotating part so as to be rotatable around an axis of rotation.

According to EP854351, the plane of rotation of the laser beam is tiltable in two swiveling planes extending perpendicular to one another. A rotational pin, which is supported so as to be tiltable in a universal ball joint bearing in the mounting frame, is tilted along with the laser unit and deflecting means by two actuating drives relative to the housing that is usually oriented horizontally. The actuating drives that are used, with their stepper motors and self-locking threaded spindles, have a complex construction and are prone to malfunctions.

According to DD291141, an electrooptical leveling instrument has a leveling telescope that is mounted in a rotatable underpart so as to be tiltable. The tilting of the leveling telescope with respect to the underpart is carried out by means of a piezo actuator that is connected to control electronics so as to be controllable.

In addition, piezo actuators are frequently used as an actuating drive according to DE3412014C1, DE19817802A1, EP1142039B1, e.g., for hexapods according to DE19742205A1, as a frictional-force drive in inertia slides according to EP360975A2, EP0799502B1, or as a dither motor apparatus for a laser gyroscope according to U.S. Pat. No. 4,987,334. In addition, according to the technical article by James Fried, et al., IEEE/ASME Transactions on Mechatronics, Vol. 9, No. 3, September 2004, different oscillation patterns can be generated depending on the control frequency with an individual, geometrically complex piezo actuator structure.

SUMMARY OF THE INVENTION

It is the object of the invention to realize a construction laser with an actuating drive having a simple construction for the deflecting means. Another aspect consists in reducing the size of the housing.

The above-stated object, as well as other advantages over the prior art are met substantially through the features recited herein, where a construction laser in a housing has a laser unit whose laser beam is deflected by deflecting means which is arranged together with the laser unit in a tilt part. The tilt part can be adjusted with respect to the housing by means of an actuating drive, where the actuating drive has at least one piezo actuator that is connected in a controllable manner to control electronics.

Accordingly, complicated gear reduction and the stepper motor components of the prior art can be eliminated by the implementation of piezo actuators serving as an actuating drive. In addition, the special requirements of the gear reduction and stepper motor components in the housing are also eliminated, thereby reducing the overall size of the construction laser.

The housing is advantageously sealed relative to the tilt part by a flexible elastic membrane so that the interior of the housing with the piezo actuators is protected against contamination. In one embodiment, the elastic membrane is advantageously provided with folds to provide increased strength, while also maintaining the flexible characteristics of the elastic membrane.

At least one tilt sensor is advantageously arranged at the tilt part so that a self-leveling construction laser can be realized by a control loop of the control electronics. The tilt sensor is sensitive to the gravitational field and is connected in a detectable manner to the control electronics.

The deflecting means are advantageously mounted in the tilt part in a manner to allow rotation around an axis, such that the construction laser forms a rotating construction laser with a laser beam that rotates at least by segments.

The tilt part advantageously has a spherical sliding surface that is mounted in frictional contact directly on at least three piezo actuators, which are arranged in the housing so as to be distributed over the surface and the spherical sliding surface is compressively pretensioned against these piezo actuators by pretensioning means. In this manner, an inertial slide is formed, wherein the tilt part can be controllably moved in all directions of the spherical surface, particularly in all three Euler angles $\Theta$, $\Phi$, $\psi$. Movement of the tilting part is provided by applying a sawtooth voltage to the individual piezo actuators by way of their shearing deformation and the mass inertia of the tilt part. The plurality of piezo actuators themselves, while retaining the same action, can also be formed as spatial areas of an individual, geometrically complex piezo actuator structure, which are distributed over the surface and which generate different oscillation patterns depending upon the control frequency.

Alternatively, the housing has an inverted spherical sliding surface on which at least three piezo actuators are directly supported in frictional contact. The three piezo actuators are arranged in the tilt part so as to be distributed over the surface. The spherical sliding surface is compressively pretensioned against these piezo actuators by pretensioning means so that the control electronics can be arranged in the tilt part.

An inertial slide is a previously known principle which is often applied for positioning in a highly precise manner over long distances, but in a relative manner. By use of the term "relative," it is meant that this principle is not particularly suitable as an absolute positioning method, but rather is always used in connection with a sensor in a control loop. With this principle, the incremental step size is very small so that very accurate positioning is possible when combined with a highly precise absolute position sensor or angle sensor. Because of the mechanical mass inertia of the spherical sliding surface and of the structural component parts located thereon, the spherical sliding surface is capable of following only the slow movements of the piezo actuator. That is, movement occurs only during the rising edge of the sawtooth voltage provided to the piezo actuator.

During the steep trailing edge of the occurring sawtooth voltage, the piezo elements deform back momentarily. During these accelerations of the piezo actuators, the mass inertia is so great that the friction between the piezo actuator and spherical sliding surface is not sufficient to transmit the occurring forces to the spherical sliding surface. The piezo actuator deforms back without the spherical sliding surface located thereon being moved along with it. The step size, which is in the nanometer range, is given by the height of the sawtooth voltage whose frequency is determined by the type of piezo actuators and the roughness of the surface of the spherical sliding surface.

In one embodiment, there are advantageously four piezo actuators that are distributed in two pairs of piezo actuators along a drive direction in each instance. The two drive directions extend perpendicular to one another. In this manner, a separable movement of the spherical sliding surface, and in particular, a clean tilting around tilt axes that are fixed with respect to the local Cartesian housing coordinates X and Y, can be realized by controlling each pair of piezo actuators.

In one embodiment, at least one piezo actuator is advantageously supported by a pressure spring means and compressively pretensioned by the latter relative to the spherical center. Accordingly, the normal force or perpendicular force is distributed more uniformly over a plurality of piezo actuators.

The deflecting means is advantageously positioned in such a way to enable the deflection of the laser beam to occur proximate the spherical center of the spherical sliding surface, thereby ensuring that the projection plane generated by the laser beam is tilted exactly around this point.

The pretensioning means advantageously comprise at least one permanent magnet and corresponding magnetizable counterpart, which are arranged so as to be distributed in the housing and in the tilt part, respectively, so that a static normal force causing the necessary static friction can be impressed in a simple manner with respect to construction and fabrication of the construction laser.

The spherical sliding surface advantageously comprises a magnetizable metal, such as iron, so that it can be produced in a simple manner in terms of construction by deep drawing and subsequent polishing.

A plurality of end stops are provided to limit the possible movements in some areas and are advantageously arranged at the spherical sliding surface so as to prevent excessive tilting, as well as multiple rotations of the spherical sliding surface.

In another embodiment, all of the piezo actuators are supported by pressure spring means in each instance, and the spherical sliding surface is gimbal-mounted at the housing so that movement around the angle of rotation $\Phi$ is prevented by the constraint of the gimbal suspension. That is, the spherical sliding surface is prevented from spinning around the axis of rotation.

Alternatively, the tilt part can be gimbal-mounted at the housing. Moreover, the tilt part can be connected in a tiltable manner to at least one piezo actuator in each instance by at least two lever mechanisms, which are offset at angles. Each lever mechanism has a lever ratio greater than 10:1. The tilting can be realized around any tilting axis by direct deformation of the piezo actuators.

Since a piezo actuator has only very small actuating paths and, for this reason, can form very high actuating forces, it is useful for purposes of positioning to transform the short actuating paths into longer positioning paths by providing rigid lever mechanisms with large lever arms. The two lever mechanisms are advantageously arranged perpendicular to one another so that a clean tilt can be realized with respect to the local Cartesian housing coordinates X and Y.

Two piezo actuators are advantageously arranged parallel to one another and form a pair of tilting actuators. By initiating oppositely directed deformation, a small linear actuating path is transformed into an angular tilting $\alpha$ with a substantially longer tilt arc.

Alternatively, the tilt part is constructed as a hexapod that is suspended directly at the housing by at least six piezo actuators. In this embodiment, any inclination around a virtual center of rotation can be adjusted directly by means of controlling the piezo actuators.

BRIEF DESCRIPTION OF THE DRAWINGS

The teachings of the present invention can be readily understood by considering the following detailed description in conjunction with the accompanying drawings, in which:

FIG. 3 is a block diagram of an alternative embodiment of the self-leveling rotating construction laser with a piezo actuator lever; and FIG. 4 is a block diagram of an alternative embodiment of the self-leveling rotating construction laser with a piezo actuator hexapod.

Figure 1:
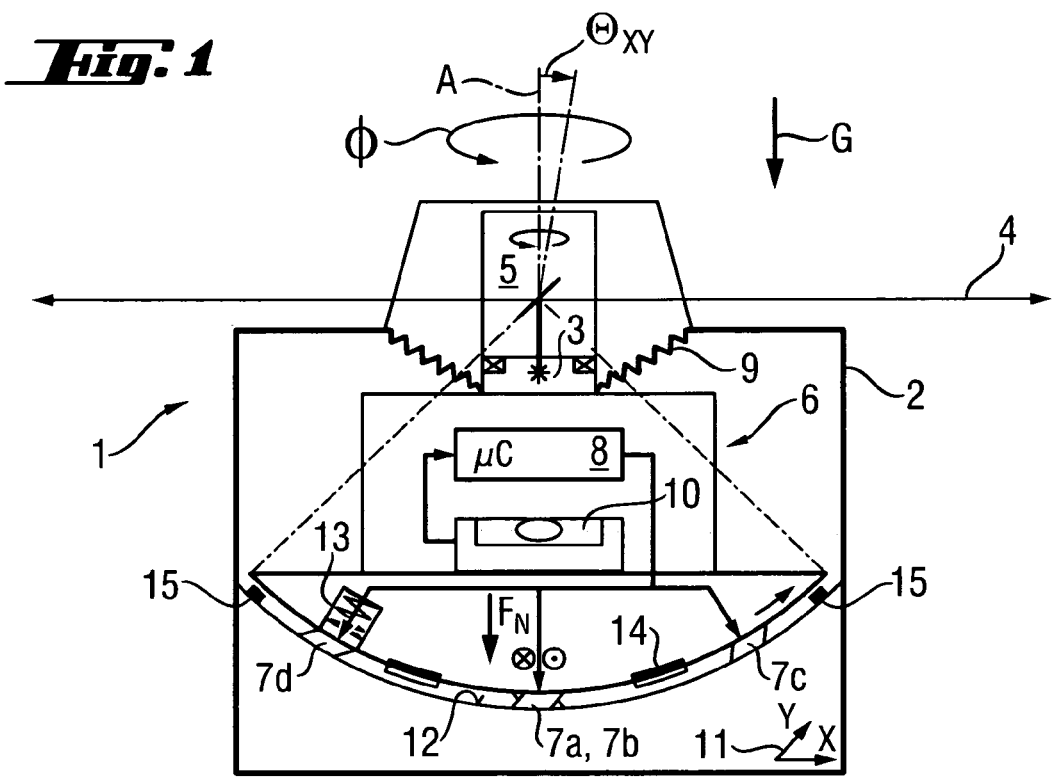
FIG. 1 is a block diagram of a self-leveling rotating construction laser of the present invention with permanent magnets.

To facilitate understanding of the invention, the same reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF THE PREFERRED EMBODIMENTS

The invention is directed to a construction laser having a housing with a laser beam deflecting means therein that is tiltable relative to the housing. In particular, the present invention is a rotating construction laser that is self-leveling according to the gravitational field, and which has a rotating laser beam. The present invention can also be applied to pipe lasers or other servo-operated construction lasers (point/line).

Referring to FIG. 1, a construction laser 1 includes a partially transparent housing 2 for facilitating a laser unit 3, a deflecting means 5, a tilt part 6, control electronics 8, and a tilt sensor 10. In an embodiment, the laser unit 3 and deflecting means 5 are arranged therein the housing 2. The laser unit 3 generates a laser beam 4 that is deflected by deflecting means 5 rotating around an axis of rotation A. The deflecting means 5 causes the deflected laser beam 4 to rotate at the angle of rotation $\Phi$ and exit through the transparent portion of the housing 2.

The housing 2 is sealed relative to the tilt part 6 by a flexible elastic membrane 9. In one embodiment, the flexible elastic membrane if includes a plurality of folds to provide additional strength for the membrane 9.

The tilt part 6 is adjustable so as to be tiltable relative to the housing 2 by an actuating drive which, in one embodiment, includes a plurality of piezo actuators 7. The piezo actuators 7 are distributed over the surface 12' (FIG. 2) of the tilt part 6 and connected in a controllable manner to the control electronics 8. In one embodiment, the tilt part 6 has a spherical sliding surface 12' which conforms to an inverted spherical sliding surface 12 of the housing 2.

In one embodiment, the sliding surface 12' of the tilt part 6 is mounted directly in frictional contact with the surface 12 of the housing by the four piezo actuators 7a, 7b, 7c, 7d. The four piezo actuators 7a, 7b, 7c, 7d are arranged in the tilt part 6 so as to be distributed over the surface 12'. In one embodiment, the fourth piezo actuator 7d is mounted in the tilt part 6 by a pressure spring means 13.

The four piezo actuators are grouped into two pairs of piezo actuators 7a+7b and 7c+7d. Each pair is distributed in a drive direction along the coordinate axes X, Y, which extend perpendicular to one another. Tilting around the tilt axes, which are fixed with respect to the housing coordinates X and Y, can be realized by controlling each pair of piezo actuators at the control electronics 8.

A tilt sensor 10, which is sensitive to the gravitational field G, is arranged at the tilt part 6 and is detectably connected to the control electronics 8. The control electronics 8 control the piezo actuators 7a, 7b, 7c, 7d by a control algorithm for executing a movement until the desired inclination $\Theta_{xy}$ relative to the gravitational field G is adjusted with reference to a Cartesian coordinate system 11, where the two coordinate axes are designated X and Y in FIG. 1. The tilt sensor 10 provides a feedback loop to the control electronics 8 during movement.

The exit (i.e., deflection) of the laser beam 4 at the deflecting means 5 is located exactly in the spherical center of the inverted spherical sliding surface 12. That is, the deflection point is defined at the origin of the inverted spherical sliding surface 12. In this manner, the projection plane generated by the laser beam is tilted at this point.

Permanent magnets 14 are arranged in the tilt part 6 opposing the inverted spherical surface 12 of the housing 2. In one embodiment, the inverted spherical surface 12 is fabricated from chromed sheet-iron as a magnetizable counterpart, although other magnetizable materials can also be utilized. The permanent magnets 14 compressively pretension the frictional contact of the piezo actuators 7a, 7b, 7c, 7d by the normal force $F_N$ by means of the inverted spherical sliding surface 12.

End stops 15 are arranged on opposing sides at the inverted spherical sliding surface 12. The end stops 15 are provided to limit the possible movements in some areas so as to prevent excessive tilting, as well as multiple rotations of the spherical sliding surface 12' of the tilt part 6.

Figure 2:
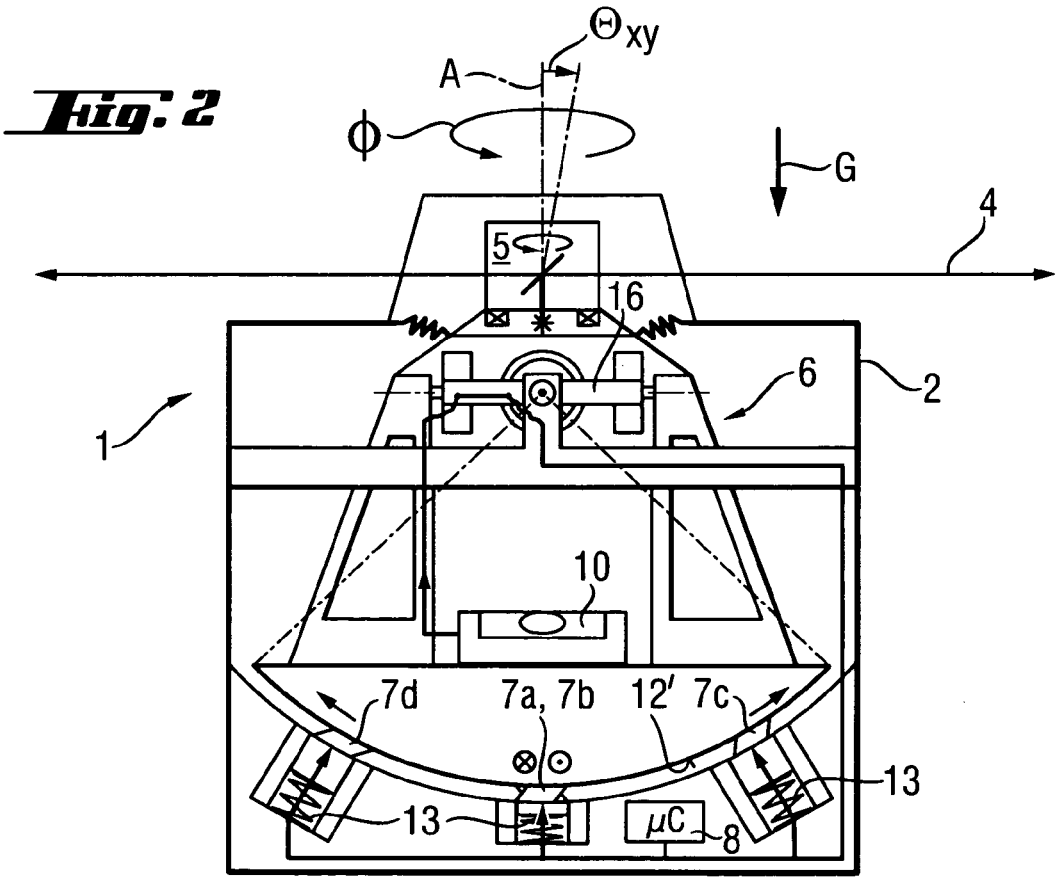
FIG. 2 is a block diagram of an alternative embodiment of the self-leveling rotating construction laser with gimbal suspension.

Referring to FIG. 2, the four illustrative piezo actuators 7a, 7, 7c, 7d are mounted by pressure spring means 13 in the housing 2 (in contrast to FIG. 1), and are connected to the control electronics 8 arranged in the latter. The tilt part 6, which includes the spherical sliding surface 12', can be fabricated from polished aluminum, among other metals. The tilt part 6 is gimbal-mounted at the spherical center of the spherical sliding surface 12' in the housing 2 by means of a gimbal suspension 16. The laser beam 4 generated by the laser unit 3 is deflected by the deflecting means 5 near the spherical center of the spherical sliding surface 12' and rotates along path $\Phi$ at an inclination $\Theta_{xy}$ with respect to axis A.

According to FIG. 3 and FIG. 4, alternative construction lasers 1 have a laser unit 3 which is arranged inside a partially transparent housing 2 and whose laser beam 4, rotating at rotational angle $\Phi$, is deflected by deflecting means 5. The deflecting means 5 rotates around the axis of rotation A, and which are arranged in a tilt part 6 together with the laser unit 3, as discussed above with respect to FIG. 1.

The tilt part 6 is adjustable in a tiltable manner relative to the housing 2 by an actuating drive having four piezo actuators 7a–7d, which are distributed over the surface and connected in a controllable manner to control electronics 8. The housing 2 is sealed relative to the tilt part 6 by means of a flexible elastic membrane 9 which is optionally shaped with folds. A tilt sensor 10 which is sensitive to the gravitational field G is arranged at the tilt part 6 and is detectably connected to the control electronics 8, which controls the piezo actuators 7a, 7b, 7c, 7d by a control algorithm until the desired inclination $\Theta_{xy}$ relative to the gravitational field G is adjusted with reference to a Cartesian coordinate system 11 with the two coordinate axes X, Y.

Referring FIG. 3, the tilt part 6 is gimbal-mounted at the housing 2 by a gimbal suspension 16. The tilt part 6 is connected in a tiltable manner to a pair of tilt actuators, where each pair illustratively includes two piezo actuators 7a+7b, 7c+7d arranged parallel to one another by means of two lever mechanisms 17a and 17b, which are arranged perpendicular to one another and have a lever ratio of 20:1. The deflection (i.e., exit) of the laser beam 4 rotating at inclination $\Theta_{xy}$ in rotational angle $\Phi$ is located in the deflecting means 5, but at a distance from the center of rotation of the gimbal suspension 16.

Referring to FIG. 4, the tilt part 6 is illustratively constructed as a hexapod 18. The hexapod 18 is connected directly to the housing 2 by means of its six piezo actuators 7a, 7b, 7c, 7d, 7e, 7f, which are arranged in a skewed manner relative to one another. In this embodiment, the center of rotation is taken into account by the control algorithm of the control electronics 8 when controlling the piezo actuators 7a, 7b, 7c, 7d, 7e, 7f. The center of rotation is located exactly where the laser beam 4 is deflected by the deflecting means 5, which rotates at inclination $\Theta_{xy}$ in the rotational angle $\Phi$.

What is claimed is:

1. A construction laser, comprising:
   a housing (2);
   a tilt part (6) arranged in the housing (2);
   a laser unit (3) arranged in the tilt part (6);
   means (5) for deflecting a laser beam (4) generated by the laser unit (3) and likewise arranged in the tilt part (6);
   actuation means for adjusting the tilt part (6) relative to the housing (2) and having at least one piezo actuator (7a); and control electronics (8) for controlling the actuation means.

2. A construction laser according to claim 1, further comprising a flexible elastic membrane (9) for sealing the housing (2) relative to the tilt part (6).

3. A construction laser according to claim 2, wherein the flexible elastic membrane (9) is formed of a plurality of folds.

4. A construction laser according to claim 1, further comprising a tilt sensor (10) provided on the tilt part (6) and connected with the control electronics (8).

5. A construction laser according to claim 1, wherein the deflecting means (5) are supported for rotation about a rotational axis (A).

6. A construction laser according to claim 1, wherein the actuation means has at least three piezo actuators (7a, 7b, 7c) widely distributed in the housing (2); wherein the tilt part (6) has a spherical sliding surface (12) supported on the at least three piezo actuators (7a, 7b, 7c) in a direct frictional contact therewith; and wherein construction laser further comprises means for pretensioning the spherical sliding surface (12) against the at least three piezo actuators (7a, 7b, 7c).

7. A construction laser according to claim 6, wherein the actuation means has four piezo actuators (7a, 7b, 7c, 7d) altogether, forming two piezo actuator pairs (7a & 7b, 7c & 7d) distributed respectively, along extending perpendicular to each other, actuation directions.

8. A construction laser according to claim 7, further comprising compression spring means (13) for supporting at least one of the piezo actuators (7d) in the housing (2) and for pretensioning the at least one of the piezo actuators (7d) against a spherical center of the spherical sliding surface (12).

9. A construction laser according to claim 8, wherein the deflecting means (5) is so arranged that an exit of the laser beam (4) is located in vicinity of the spherical center.

10. A construction laser according to claim 6, where the pretensioning means comprises at least one permanent magnet (14) and a magnetizable counterpart arranged, respectively, in the housing (2) and in the tilt part (6).

11. A construction laser according to claim 6, wherein the spherical sliding surface (12) is formed of magnetizable metal.

12. A construction laser according to claim 6, further comprising a plurality of end stops arranged on the spherical sliding surface (12) for limiting possible movements in some areas.

13. A construction laser according to claim 6, wherein each of the piezo actuators is supported by compression spring means, and the spherical sliding surface (12) is gimbal-mounted in the housing (2).

14. A construction laser according to claim 1, wherein the deflecting means (5) is supported for rotation about a rotational axis (A).

15. A construction laser according to claim 1, wherein the actuation means has at least three piezo actuators (7a, 7b, 7c) widely distributed in the housing (2); wherein the tilt part (6) has an inverse spherical sliding surface (12') supported on the at least three piezo actuators (7a, 7b, 7c) in a direct frictional contact therewith; and wherein construction laser further comprises means for pretensioning the spherical sliding surface (12') against the at least three piezo actuators (7a, 7b, 7c).

16. A construction laser according to claim 15, wherein the actuation means has four piezo actuators (7a, 7b, 7c, 7d) altogether, forming two piezo actuator pairs (7a & 7b, 7c & 7d) distributed along extending perpendicular to each other, actuation directions, respectively.

17. A construction laser according to claim 16, further comprising compression spring means (13) for supporting at least one of the piezo actuators (7d) in the housing (2) and for pretensioning the at least one of the piezo actuators (7d) against a spherical center of the spherical sliding surface (12).

18. A construction laser according to claim 17, wherein the deflecting means (5) are so arranged that an exit of the laser beam (4) is located in vicinity of the spherical center.

19. A construction laser according to claim 15, where the pretensioning comprises at least one permanent magnet (14) and a magnetizable counterpart arranged, respectively, in the housing (2) and in the tilt part (6).

20. A construction laser according to claim 15, wherein the inverse spherical sliding surface (12') is formed of magnetizable metal.

21. A construction laser according to claim 15, further comprising a plurality of end stops arranged on the inverse spherical sliding surface (12') for limiting possible movements in some areas.

22. A construction laser according to claim 15, wherein each of the piezo actuators is supported by a compression spring means, and the spherical sliding surface (12) is gimbal-mounted in the housing (2).

23. A construction laser according to claim 1, wherein the tilt part (6) is gimbal-mounted in the housing (2), wherein the actuation means has at least two piezo actuators (7a, 7e), and wherein the construction laser further comprises at least two lever mechanisms (17a, 17b) angularly offset relative to each other and each having a lever ratio greater than 10:1 for tiltably connecting the tilt part (6) with the at least two piezo actuators (7a, 7c), respectively.

24. A construction laser according to claim 23, wherein the two lever mechanisms (17a, 17b) are arranged perpendicular to one another.

25. A construction laser according to claim 21, wherein the at least two piezo actuators (7a, 7b) are arranged parallel to one another, forming a pair of tilting actuators.

26. A construction laser according to claim 1, wherein the tilt part (6) is formed as a hexapod suspended directly at the housing (2) by at least six piezo actuators (7a, 7b, 7c, 7d, 7e, 7f).

* * * * *